United States Patent [19]

Quinn et al.

[11] Patent Number: 4,909,892

[45] Date of Patent: Mar. 20, 1990

[54] APPARATUS FOR WELDING THERMOPLASTIC FRAME MEMBERS

[75] Inventors: Robert Quinn, Huntington; Louis Sparacino, Kings Park; John Grandy, Nesconset; Paul Barbero, Sayville, all of N.Y.

[73] Assignee: Sampson Machine Company, Hauppauge, N.Y.

[21] Appl. No.: 286,999

[22] Filed: Dec. 20, 1988

Related U.S. Application Data

[63] Continuation-in-part of Ser. No. 54,792, May 27, 1987, Pat. No. 4,828,239.

[51] Int. Cl.$^4$ .......................... B25B 1/20; B29C 65/20
[52] U.S. Cl. .................................. 156/499; 29/281.5; 156/304.2; 156/304.6; 156/507; 156/557; 156/580; 156/583.6; 269/41; 269/43; 269/119

[58] Field of Search ............... 156/304.1, 304.2, 304.6, 156/502, 507, 499, 580, 557, 583.1, 583.6; 269/41, 42, 43, 119; 29/281.5; 100/194, 195, 199

[56] References Cited

PUBLICATIONS

U-R-B-A-N AKS 4000 Brochure dated Jul. 1982.
U-R-B-A-N AKS 4210 Brochure dated 7-84.
U-R-B-A-N AKS 3500 AKS 3510 Brochure dated 8-84.
U-R-B-A-N AKS 4010 AKS Brochure dated 2-85.

*Primary Examiner*—Michael Wityshyn
*Attorney, Agent, or Firm*—Hoffmann & Baron

[57] ABSTRACT

An apparatus for simultaneously welding two or more pairs of thermoplastic frame elements is disclosed. The apparatus includes a clamp or jig assembly which maintains the frame elements in alignment with respect to each other and to a heating plate. A driving assembly is provided for moving the frame elements towards the heating plate and/or towards each other for heating and fusion.

11 Claims, 5 Drawing Sheets

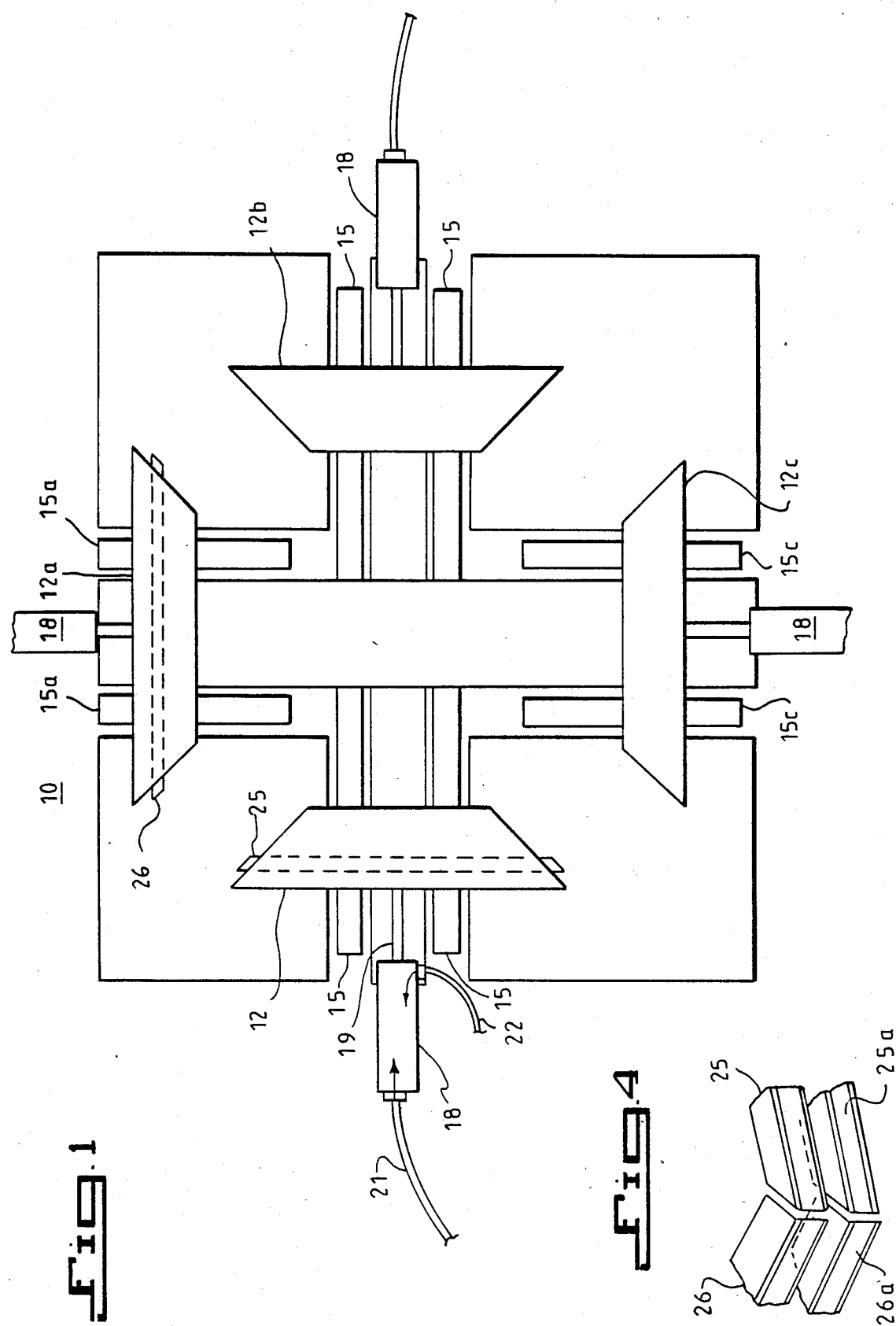

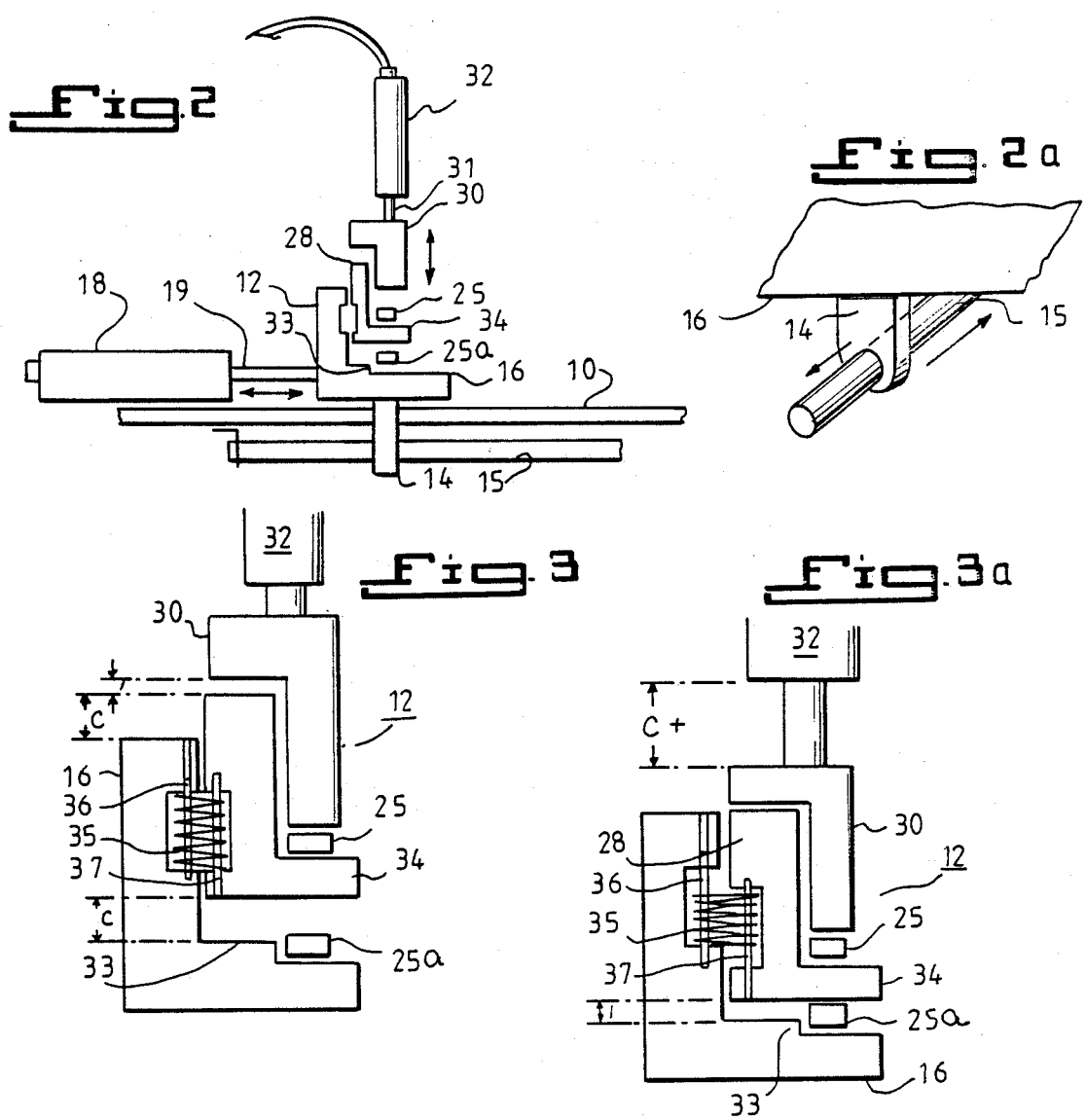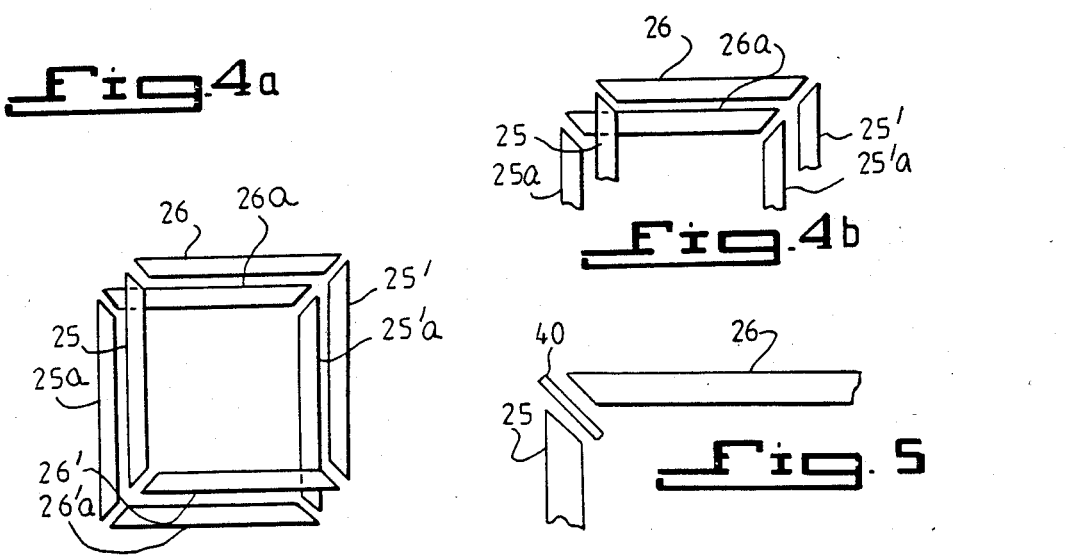

APPARATUS FOR WELDING THERMOPLASTIC FRAME MEMBERS

CROSS REFERENCE TO RELATED APPLICATION

This application is a continuation-in-part of application Ser. No. 54,792 filed May 27, 1987, now U.S. Pat. No. 4,828,239.

BACKGROUND OF THE INVENTION (1) Field of the Invention.

The present invention relates to apparatus for joining thermoplastic frame elements. More particularly the present invention relates to welding machines for welding corners or joints of frames such as window and door frames.

(2) Brief Description of the Prior Art.

Prior to the use of plastics in the manufacture of window and door frames, both wood and metal were used for making such frames. The frame elements (i.e. stiles and rails), when made out of wood, were secured by either an adhesive, nails, screws or some other connector, or a combination of two or more of the holding or connector components. When metals were used for the frame elements, the pairs of frame elements were connected and held together by welding, screwing or crimping the corners together.

The welding of structural metal frames for support of equipment is well known. Elements of a frame are cut to size and contour, and positioned together to form a corner. An insert is usually welded to both elements to hold them in position, thus forming a corner. Some of the frame elements are very heavy and sometimes require the use of auxiliary tables on which to initially locate the ends of the frame elements or sections to be welded.

Later, elements of the frame are secured and supported on pivotable clamps which are adapted to lock into place and firmly hold the elements of the frame in proper relationship to each other in preparation for welding. Such a fixture is more completely described in U.S. Pat. No. 3,054,887 issued Sept. 18, 1962.

Metal has also been used in the manufacture of window frames, but the stiles and rails are of substantially lighter weight metal than that used in structural frames. However, since the frame elements have to be rigidly held in position for joining them to form the corners, essentially the same type of equipment used to form structural frames is used to form the much lighter window frames, except that the equipment itself is scaled down in size and capability.

With the development of stronger plastics, such as vinyl compounds, for example, window frames and door frames have been made from plastic elements. With the use of such lighter plastic elements, light weight simple jigs may be used to support and hold adjacent elements of the frames in position to be welded.

Commercial equipment is available which welds plastic elements of a window or door frame together to form one or more corners of the plastic frame. Single point and multi-point welding machines provide means for fusing the ends of the same plastic frame together to form one or two corners, respectively. However, where technology has advanced in the materials used, the handling of the elements forming the frames has not kept pace with the advancement in such materials. Conventional equipment does not permit the welding of more than one frame in a single operation.

SUMMARY OF THE INVENTION

The present invention is directed to an apparatus for welding thermoplastic frame elements to each other. The apparatus includes means for supporting first and second pairs of frame elements such that said pairs are oriented at a selected angle (e.g. perpendicular) with respect to each other, means for separating the frame elements constituting each pair by a selected distance, means for urging the pairs of frame elements towards each other, and means for welding the respective end portion of each pair of frame element to each other to form a joint or corner.

In accordance with a preferred embodiment of the invention, a jig assembly is provided for handling frame elements of different sizes or lengths. The jig assembly includes a base element, a top element, and a middle element positioned between the top and base elements. Means are provided for moving the middle and base elements towards and away from each other and for moving the middle and top elements towards or away from each other. The middle element may be connected by a spring to either the base or top elements such that it "floats" therebetween.

It will be apparent that the cascade handling of multiple frames or multiple pairs of frame elements in the same operation effectively updates the manufacturing of window and door frames.

BRIEF DESCRIPTION OF THE DRAWINGS

FIG. 1 is a representation, in plan view, of a frame element retaining apparatus;

FIG. 2 is a representation in side view, of a frame welding apparatus in accordance with the invention;

FIG. 2a is a perspective view of a portion of a rail assembly upon which a jig assembly is mounted;

FIG. 3 represents in more detail a preferred embodiment of a jig assembly for holding multiple frame elements, in relaxed position;

FIG. 3a represents the jig assembly of FIG. 3 in closed or clamped position;

FIGS. 4, 4a and 4b are schematic illustrations of pairs of frame elements as positioned by one or more jig assemblies;

FIG. 5 is a top plan view of one corner of the frame element arrangement shown in FIG. 4(b);

DETAILED DESCRIPTION OF THE PREFERRED EMBODIMENT

Figure 6:
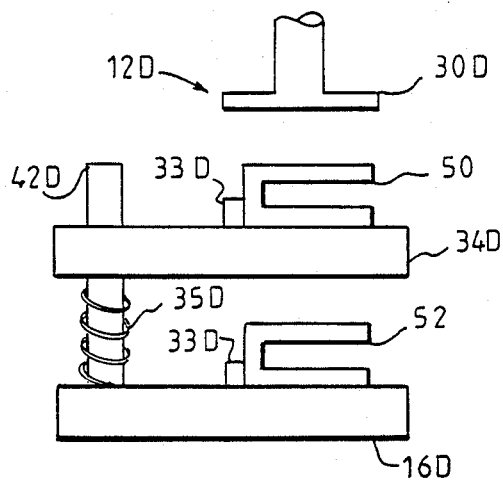
FIGS. 6–11 are schematic illustrations of various assemblies for mounting thermoplastic frames to a welding apparatus.

Referring now to FIG. 1, a frame element welding apparatus is represented which, in accordance with the invention, may be used as an eight point apparatus for simultaneously joining of stacked pairs of frame elements. Four jig assemblies 12–12c are mounted to the upper surface of the apparatus, each of which may secure two or more frame elements. Four pneumatic cylinders are provided, each of which includes a piston rod coupled to one of the jigs for moving the jig toward and away from the center of the table. Each jig is represented as having two runners which ride on rails secured to the under structure of the table.

The welding heads (i.e. heating plates) for fusing the thermoplastic frame elements are not illustrated or represented in FIG. 1. Such plates are used to heat the angled ends of the frame elements together prior to fusing them to form the welded corners of one or more frames.

A table 10 supports the runners or rails, the jig assemblies and the pneumatic positioning cylinders. The jig assemblies 12, 12a, 12b and 12c are each mounted on runners which are more clearly illustrated in FIGS. 2 and 2a. Each runner 14 rides on rail 15, the runner being coupled to the base element 16 of the jig 12. The positioning cylinders are preferably pneumatic and preferably have bi-direction control as seen at cylinder 18 of FIG. 1. The piston rods 19 are connected to the respective base elements 16 of the jig assemblies and drive the jig assemblies reciprocally with respect to the center of the table 10.

With frame elements clamped into the jig assemblies, the jig assemblies may be moved so that the ends of the frame elements come together to form corners, such as seen in FIGS. 4, 4a and 4b. These ends are heated by the heating plate and then joined. Upon cooling, the frame elements are welded together in a substantially perpendicular configuration.

FIG. 2 represents in more detail the jig assembly 12 and its coupling, via the runner 14 to the rail 15 so that the piston rod 19 may drive the jig assembly inward along the rail 15 by air pressure applied through hose 21 while hose 22 is open. The jig may be driven outwardly with respect to the center of the table 10, by applying air pressure through hose 22 while opening hose 21.

Thermoplastic frame elements 25 and 26 are shown in FIG. 1 within jig assemblies 12 and 12a. When the jigs 12 and 12a are positioned so that the angled ends of the frame elements 25 and 26 are adjacent, these ends are pressed against a heating plate 40 as shown in FIG. 5 for an appropriate length of time. The plate is withdrawn and the jig assemblies are again moved to press the ends against each other, thereby allowing fusion to occur.

As seen in FIG. 2, the base element 16 of the jig assembly 12 is coupled to the piston rod 19 so that the jig assembly 12 may be positioned along the rail 15.

Jig assembly 12 includes the base element 16, a floating element 28 add a clamp element 30. Floating element 28 serves as a clamp element for the base element 16 and also serve as a base element for the clamp element 30. The clamp element 30 is coupled to the clamp cylinder 32 which travels in a perpendicular direction relative to the surface of the table 10. FIG. 3 represents the multi-element dual clamp in open position. FIG. 3a represents the multi-element dual clamp in closed position.

A pneumatic cylinder 32 is mounted so as to follow the jig assembly 12 when the jig assembly is moved by the positioning cylinder 18.

It will be seen that the dual purpose floating element 28 is loosely connected to the base element 16 by the spring-pin network 35, 36 and 37. The pins 36 and 37 are driven into the respective elements 16 and 28 passing through the spring 35. These serve to hold the floating element 28 in normal open position and permit the clamping action when the clamp element forces the floating element into a clamp position on the base element, essentially converting the floating element into a base element with respect to the top clamp element 30.

A piston 31 extending from cylinder 32 moves the clamp element into closed (FIG. 3a) and open (FIG. 3) positions The shoulder 33 of the base element 16 ensures that the frame elements 25 and 25a will be in vertical alignment while the thickness of the lip 34 ensures the frame elements will be separated, assuming, that is, that the frame elements are straight.

FIGS. 4a and 4b and 5 represent eight point, four point and four point welding positions respectively. In FIG. 4(a), four heating plates (not shown) would be used to heat the ends of each frame member 25, 25a, 26, 26a, 25', 26', 55a', 26a' so that they can be fused to the adjacent frame members. Two complete frames, each having four corners, are therefore formed simultaneously. In the example shown in FIGS. 4b and 5, two corners of each of two frames are heated and then joined together.

It is preferable that the jig assembly grasp and secure stacked frame elements close to the ends to be welded with short, predetermined lengths of the ends exposed. The length of the ends exposed may vary.

In practicing the invention, a pair of jig assemblies would accommodate frame elements as short as one foot as well as those elements longer in length, depending on the size of the table and the distance jig assemblies of the same pair may be separated. Pairs of jig assemblies are preferably adjustable, relative to the spacing between them so as to accommodate different length frame elements, without changing jigs.

FIGS. 6–11 illustrate various alternative embodiments of the invention for securing pairs of frame elements so that stacked and spaced pairs of such elements can be heated at the ends thereof and then fused to an adjoining pair.

Referring first to FIG. 6, one of a pair of jig assemblies 12D is shown which includes a base element 16D including an abutment 33D, a "floating" element 34D supported by a coil spring 35D, and a top clamp assembly 30D. The spring 35D is supported by a column 42D mounted to the base element 16D and extending through the middle, floating element 34D. Movement of the clamp assembly downwardly causes the upper frame element 50 to be secured between the clamp assembly and the floating element. Further downward movement of the clamp assembly results in the clamping of a lower frame element 16D. The abutments 33D maintain each frame element in vertical alignment. A pair of jig assemblies as shown in the Figures are moved towards each other to join pairs of frame elements at right angles to each other.

Figure 7:
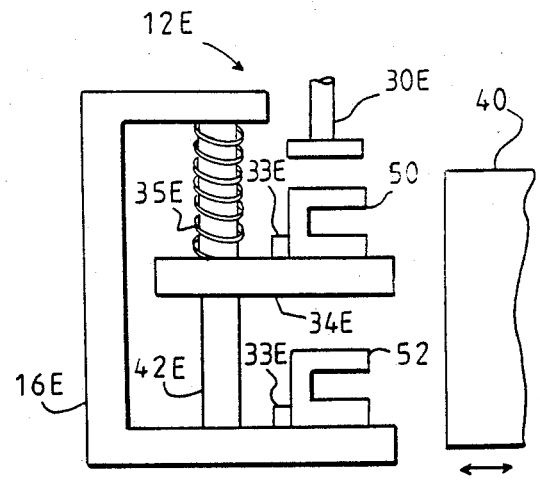

FIG. 7 illustrates a jig assembly 12E similar to that shown in FIG. 6. In this embodiment, the base element 16E has a C-shaped configuration which allows the floating element 34E to be suspended from the top portion thereof by a coil spring 35E. The spring is held in position by a column 42E. Once the frame elements are clamped in place upon lowering of the top clamp assembly 30E, the heating plate 40 is moved to a position adjacent to the ends of the frame elements to commence the "burn-off" and fusion cycles. Abutments 33E insure that the frame elements are properly aligned on the floating and base elements.

Figure 8:
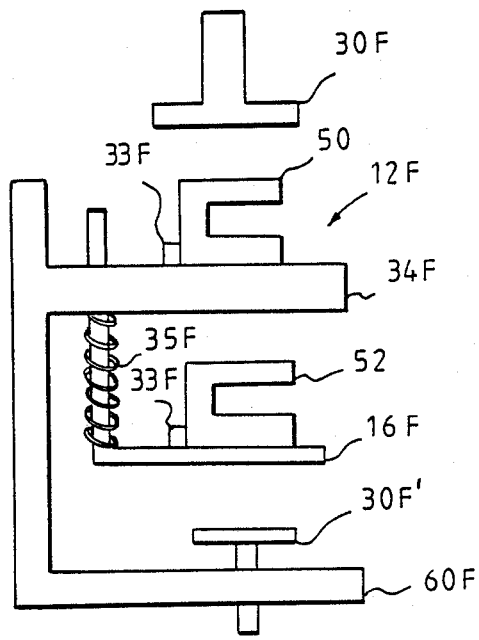

FIG. 8 illustrates a jig assembly 12F including a fixed middle element 34F and a resiliently supported base element 16F. The middle element is supported by an L-shaped mounting structure 60F. Abutments 33F are provided to vertically align two frame elements 50,52. The two clamp assemblies 30F, 30F' may be actuated to secure or release the frame elements as the base element 16F is urged towards or away from the middle element 34F.

Figure 9:
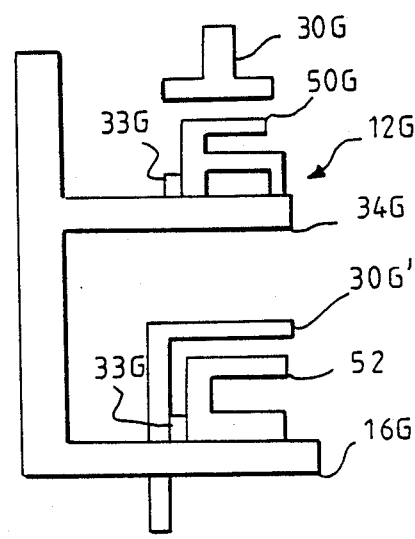

Referring to FIG. 9, one of a pair of adjoining jig assemblies 12G is shown in the "open" position. The assembly includes an L-shaped base element 16G having a fixed projection 34G extending therefrom. A pair of clamp assemblies 30G, 30G' are employed for securing frame elements 50G and 52. Abutments 33G insure that the frame elements are properly aligned.

Figure 10:
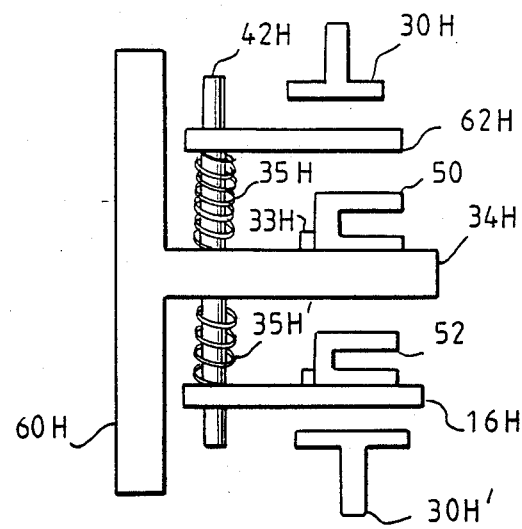

The embodiment shown in FIG. 10 includes a fixed middle element 34H an "floating" top 62H and base 16H elements supported by springs 35H, 35H'. The springs are mounted to a substantially vertically extending rod 42H. A pair of clamp assemblies 30H, 30H' are provide for securing the thermoplastic frame elements 50, 52 prior to commencement of the welding process. Abutments 33H maintain the frame elements in vertical alignment so they may be fused to a second pair of such elements at a ninety degree angle. A T-shaped support 60H supports all of the above elements except for the clamp assemblies.

Figure 11:
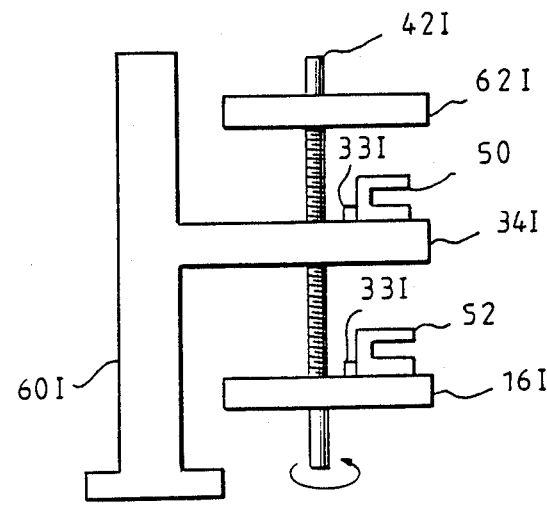

FIG. 11 illustrates another embodiment of the invention including a T-shaped support 60I defining a fixed middle element 34I. A threaded rod 42I extends through the middle element and supports an upper clamping element 62I and a base element 16I. The rod includes right handed threads between the middle and upper elements and left handed threads between the middle and base elements. Upon rotation of the rod, the upper and base elements are urged towards or away from the thermoplastic frame elements 50, 52, thereby causing them to be clamped or released by the middle, upper and base elements.

Figure 12:
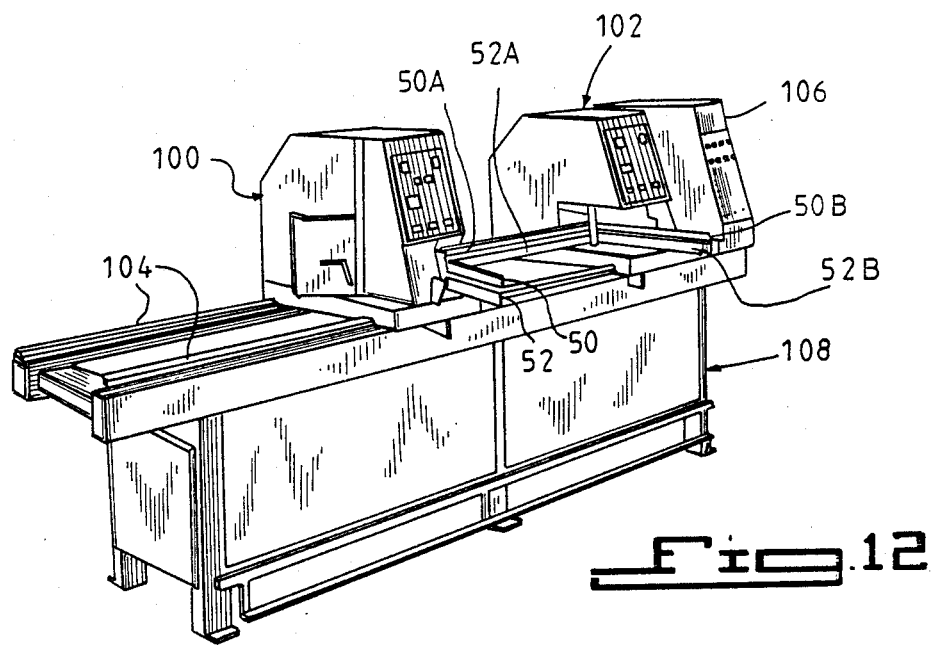
FIG. 12 is a front perspective view of a frame welding assembly.

FIG. 12 illustrates left and right hand welding stations 100, 102 which are slidably mounted upon a set of tracks 104. A control module station 106 for controlling the welding stations is also mounted upon the tracks. The entire assembly is mounted to a support 108.

Figure 13:
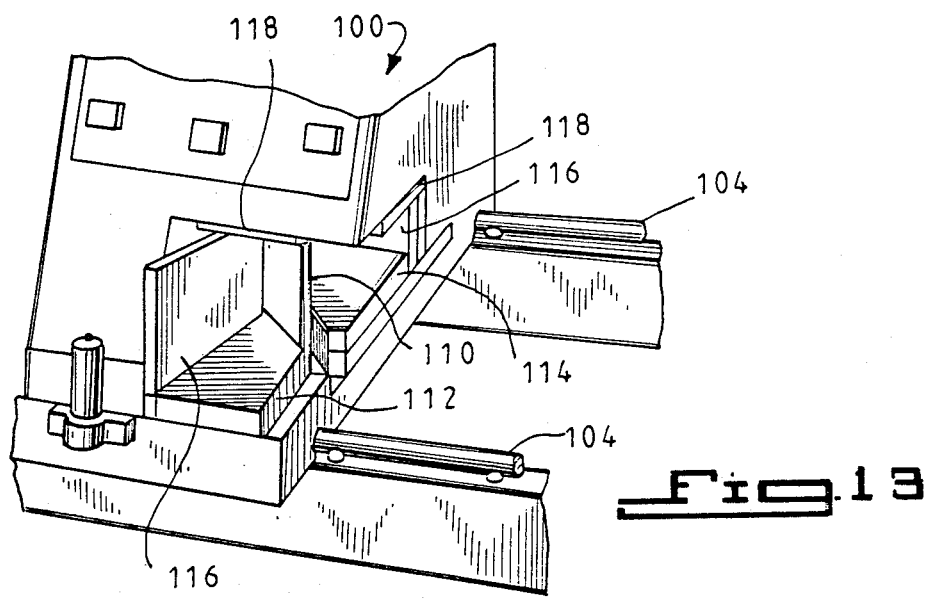
FIG. 13 is a front perspective view of a left hand welding station.

Three pairs of thermoplastic (PVC) frame elements 50, 52, 50A, 52A, 50B, 52B are mounted to the welding assembly. The fixture for clamping the frame elements within each welding station shown in FIGS. 12 and 13 is omitted to provide greater clarity. The frame elements are omitted from FIG. 13 for the same purpose.

Referring to FIG. 13, the lower portion of the left hand welding station 100 is shown in greater detail. The station includes a retractable, spring mounted heater plate 110 which is positioned between a pair of base plates 112, 114. A pair of knives (not shown) are positioned, respectively, between the base plates and heater plate for controlling the bead which is formed when the frame elements are "burned off" at their end and later fused. Fence plates 116 define two sides of the welding area. Limiters 118 are mounted near the top of the welding area and provide heat to the frame elements, thereby reducing the temperature gradients therein during the welding process.

A pair of rig assemblies, such as shown in FIG. 6 and designated by numeral 12D, are mounted, respectively, to each of the base plates 112, 114 of the welding station 100. The rig assemblies are magnetically coupled to the respective fence plates 116. Base plate 112 remains stationary during the welding process while base plate 114, and the rig assembly mounted thereto, is slidable towards and away from the heater plate 110. During the burn-off cycle, frame elements 50A, 52A are urged towards the heating plate 110 as the base plate 112 slides under the force of a pneumatic cylinder (not shown). As the frame elements 50A, 52A contact the heater plate, the heater plate is urged towards the second pair of frame elements 50, 52 in the welding station 100, eventually contacting them and causing a selected length thereof to be burned off. Upon retraction of the heater plate 110, the base plate 112 and rig assembly mounted thereto again slides in the direction of second pair of frame elements, causing the ends of the respective pairs of frame elements to be pressed against each other. Upon cooling, the frame elements will be fixed at a ninety degree angle.

The process described above takes place simultaneously at the right hand welding station 102 with respect to frame elements 50A, 52A, 50B, 52B. Three pairs of frame elements are accordingly simultaneously joined in a single operation. It will also be apparent to those skilled in the art that additional frame elements may be joined by modifying the rig assemblies mounted within each wedding station.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for welding thermoplastic frame elements to each other, comprising:
    means for supporting a first pair of thermoplastic frame elements and a second pair of thermoplastic frame elements, each of said thermoplastic frame elements including end portions, said supporting means including means for mounting said pairs of thermoplastic frame elements at a selected angle with respect to each other;
    means for separating the thermoplastic frame elements constituting each pair by a selected vertical distance;
    means for urging said first pair of thermoplastic frame elements and said second pair of thermoplastic frame elements perpendicularly with respect to each other such that said respective end portions of said first pair of thermoplastic frame elements are moved towards said respective end portions of said second pair of thermoplastic frame elements, and
    means for welding said respective end portions of said first pair of thermoplastic frame elements to said respective end portions of said second pair of thermoplastic frame elements.

2. An apparatus as defined in claim 1 including means for maintaining each frame element of each pair in vertical alignment.

3. An apparatus as defined in claim 1 wherein said supporting means includes a base element, a middle element positioned above said base element, and a top element positioned above said middle element for supporting said first pair of thermoplastic frame elements, means for moving said middle element and said base element towards and away from each other, and means for moving said middle element and said top element towards and away from each other.

4. An apparatus as defined in claim 3 wherein said separating means includes said middle element.

5. An apparatus as defined in claim 4 including means for resiliently mounting said middle element to said base element.

6. An apparatus as defined in claim 5 wherein said top element is a clamp element, and said means for moving said middle element and said top element towards each other includes a clamp cylinder and a piston rod connecting said clamp element with said clamp cylinder.

7. An apparatus as defined in claim 3 wherein said base element includes an upper surface for supporting one of said first pair of thermoplastic frame elements and an abutment for engaging said one thermoplastic frame element.

8. An apparatus as defined in claim 7 wherein said middle element includes an upper surface for supporting the other of said first pair of thermoplastic frame elements and an abutment for engaging said other thermoplastic frame element.

9. An apparatus as defined in claim 8 wherein said abutment of said middle element is in vertical alignment with said abutment of said base element.

10. An apparatus as denied in claim 4 including means for resiliently mounting said middle element to said top element.

11. An apparatus as defined in claim 1 wherein said selected angle is about ninety degrees.

* * * * *